April 5, 1960 F. F. OFFNER 2,931,985

DIFFERENTIAL D.-C. AMPLIFIER

Filed March 25, 1957 2 Sheets-Sheet 1

INVENTOR

Franklin F. Offner

BY Pierce, Scheffler & Parker

ATTORNEYS

April 5, 1960 F. F. OFFNER 2,931,985

DIFFERENTIAL D.-C. AMPLIFIER

Filed March 25, 1957 2 Sheets-Sheet 2

INVENTOR

Franklin F. Offner

BY Pierce, Scheffler & Parker

ATTORNEYS 2,931,985

DIFFERENTIAL D.-C. AMPLIFIER

Franklin F. Offner, Chicago, Ill.

Application March 25, 1957, Serial No. 648,297
8 Claims. (Cl. 330—10)

This invention relates to differential D.-C. amplifiers of the chopper type, and in particular to means for reducing the transmission of common mode signals therein.

In the past, such amplifiers have been constructed using transformer coupled input, in which by elimination of a ground connection on the input, the common mode signal can be effectively eliminated. However, in some applications the use of a transformer at the input is undesirable. The present invention makes the use of the transformer unnecessary. By this means high input impedance and good frequency response of the amplifier are attained.

Referring now to the figures:

In Figure 1 is shown a generalized form of differential amplifier design.

In Figure 2 is shown a differential amplifier having a differential signal source applied to its input.

In Figure 3 is shown a differential amplifier having a common mode signal applied to its input.

In the use of a chopper type D.-C. amplifier, as shown for example in my previous United States Patent No. 2,688,729 granted September 7, 1954, or in my co-pending application Serial No. 426,325 filed April 29, 1954, a signal voltage which may have a direct current component is converting into an alternating current by the action of a periodically acting switch. This alternating current signal can be stably amplified by an amplifier, and subsequently rectified by a demodulator, either of the periodically acting mechanical switch type or of the electronic type. By this means the original signal is again obtained, but in amplified form. The method of amplification has the great advantage that drift which is inherent in electronic D.-C. amplifiers is eliminated.

Figure 1:
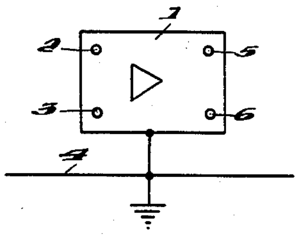
Figure 2:
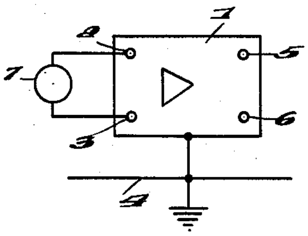

In a differential amplifier, the difference in potential between two points is amplified, neither of these points being at ground (reference) potential. Referring to Figure 1, the amplifier is shown schematically by the block 1. The input terminals are 2 and 3. If the amplifier is a true differential amplifier, the output signal, which is developed between terminals 5 and 6, will depend only upon the voltage applied between terminals 2 and 3, and not upon any voltage applied between the reference (ground) terminal 4, and terminals 2 and 3 in common. That is, if a signal is applied as shown in Figure 2, between terminals 2 and 3, 7 being the signal source, an amplified form of the signal is developed between the opposite terminals 5 and 6. However, if terminals 2 and 3 are tied together as shown in Figure 3, and the signal applied between these terminals in common and ground, no signals should be developed between terminals 5 and 6.

Figure 4:
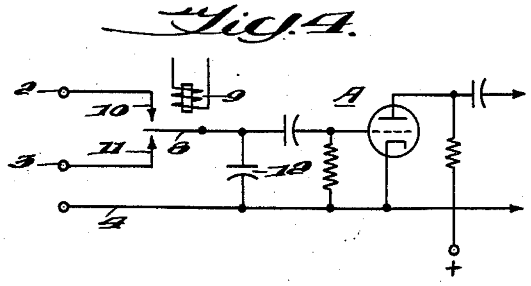
Figure 4 illustrates a chopper input circuit, suitable for use with an amplifier.

If a transformer is used at the input to the amplifier, as illustrated for example in my aforesaid patent, the common mode transmission is effectively eliminated, since the input of the amplifier is effectively isolated from ground. However, it is not always practical to use an input transformer. Particularly, it is difficult to select a transformer providing very high input impedance, and at the same time to have satisfactory frequency response. It is therefore, desirable in some cases to employ the chopper directly at the input of an electronic tube or transistor amplifier. In the circuit shown in Fig. 4, vibrating reed 8 of the chopper switch is actuated by coil 9, which has an alternating current of the desired operating frequency passed through it. Reed 8 alternately makes contact with contacts 10 and 11, which are connected to the two input terminals 2 and 3. The input is followed by an electronic amplifier of any conventional type, that illustrated being the input to a vacuum amplifier "A."

Consider now that a signal source of a constant voltage is applied between input terminal 2 and ground terminal 4; and that another source, of another constant voltage, is applied between terminal 3 and ground terminal 4. Now when reed 8 is in contact with contact 10, condenser 12 will be charged up to the potential of terminal 2, and conversely when it is in contact with contact 11, it will be charged to the potential of terminal 3. Thus as the reed vibrates back and forth, it will alternately charge condenser 12 to these two potentials, producing a potential variation which is amplified by the following electronic amplifier A. Thus if terminal 2 is at 10 volts and terminal 3 is at 9 volts, the potential fluctuation at the input is one volt, and the amplifier thus amplifies the difference between these two potentials. It will now be seen that if terminals 2 and 3 are connected together, or to potential sources of equal amplitude, no signal will be obtained, no matter how large this potential may be. That is, the amplifier does not transmit at all a common D.-C. signal.

Figure 3:
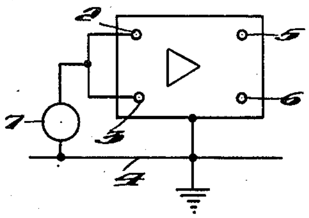

The same situation does not obtain for A.-C. signals applied in common to two input terminals 2 and 3, as shown for example in Figure 3. If a signal is applied in this way to the amplifier in Figure 4, for example, it will be seen that this A.-C. signal is connected to the amplifier input substantially all the time: First, through terminal 2 when the vibrating reed is in contact with contact 10, and then alternately through terminal 3, when it is in contact with contact 11. Since the following amplifier is an A.-C. amplifier, this A.-C. signal will be transmitted through it. Obviously if the amplifier is less responsive to low frequency A.-C. signals, such low frequency common mode signals will be attenuated in transmission, but to some extent at least all common mode A.-C. signals will be transmitted.

Figure 5:
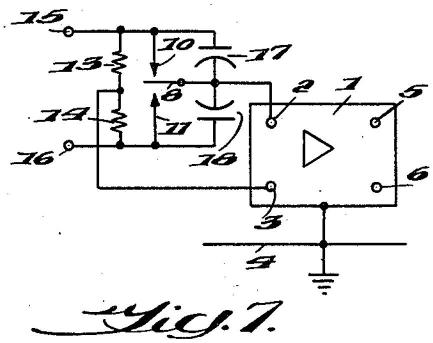
Figure 5 illustrates an improved chopper input circuit for minimizing the effect of comon mode signals.

This transmission of a common mode A.-C. signal can be minimized by the use of a differential A.-C. amplifier following the chopper. The application of the chopper to the input of such an amplifier, as shown on Figure 1, is illustrated in Figure 5. Two resistors 13 and 14, preferably of equal value, are placed in series across the input terminals 15 and 16, these terminals now representing the signal input terminals. Resistors 13, 14 constitute an averaging circuit for deriving the average signal potential applied to the two input terminal 15, 16. Two condensers 17 and 18 are placed from each chopper contact 10 and 11, to reed 8.

It will now be seen that the common mode signal applied to 15 and 16 will at all times be connected to input terminal 2 of amplifier 1. By definition, the common mode signal is the same on both input terminals 15 and 16, so that the input to terminal 2 of amplifier 1 will not change when reed 8 transfers from contact 10 to contact 11; and when in the intermediate position, the signal is coupled to amplifier 1 through condensers 17 and 18.

At the same time, an equal common mode signal is applied to input terminal 3 of amplifier 1, through resistors 13 and 14. It is, of course, assumed that the input impedance of amplifier 1 is very high compared with resistances 13 and 14, as well as with the capacitive reactance of condensers 17 and 18 at the operation frequency of the chopper.

Since equal common mode signals are applied to the terminals 2 and 3 in amplifier 1, by the definition of a differential amplifier, the output between terminals 5 and 6 will not be affected by such a common mode signal. Thus the amplifier arrangement illustrated in Figure 5 has infinite rejection of D.-C. common mode signals, just as the amplifier of Figure 4; and a rejection of common mode A.-C. signals only limited by the degree to which amplifier 1 approaches a true differential amplifier.

Figure 6:
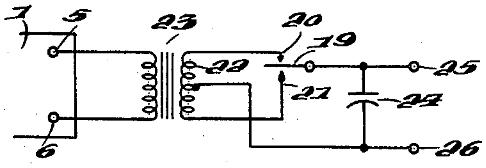
Figure 6 illustrates one form of chopper output circuit.

The output of the amplifier of Figure 5 may employ chopper contacts synchronous with the input chopper, if it is desired to produce the differential input signal between terminal 15 and 16 in amplified form. This is illustrated in Figure 6. Here reed 19 operates synchronously with reed 8, connecting alternately to terminals 20 and 21 of the output chopper. These contacts are connected to the terminal ends of a center tapped secondary 22 of transformer 23, the primary of which is connected to output terminals 5 and 6 of amplifier 1. Thus the chopped wave transmitted by amplifier 1 is re-synthesized by the action of this chopper. Condenser 24 is placed across the output in order to absorb switching transients. The amplified facsimile of the input signal is developed across output terminals 25 and 26.

Figure 7:
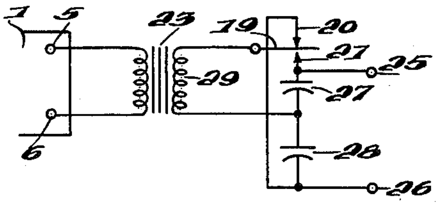
Figure 7 illustrates another form of chopper output circuit.

Alternatively, the output circuit shown in Figure 7 may be employed. This circuit has advantages described more fully in my co-pending application Serial No. 597,455, filed July 12, 1956. It will be seen that the secondary 29 of transformer 23 is switched by the reed 19 of the output chopper to alternate sides of a series combination of condensers 27 and 28, again producing a facsimile of the input signal across terminals 25 and 26.

Figure 8:
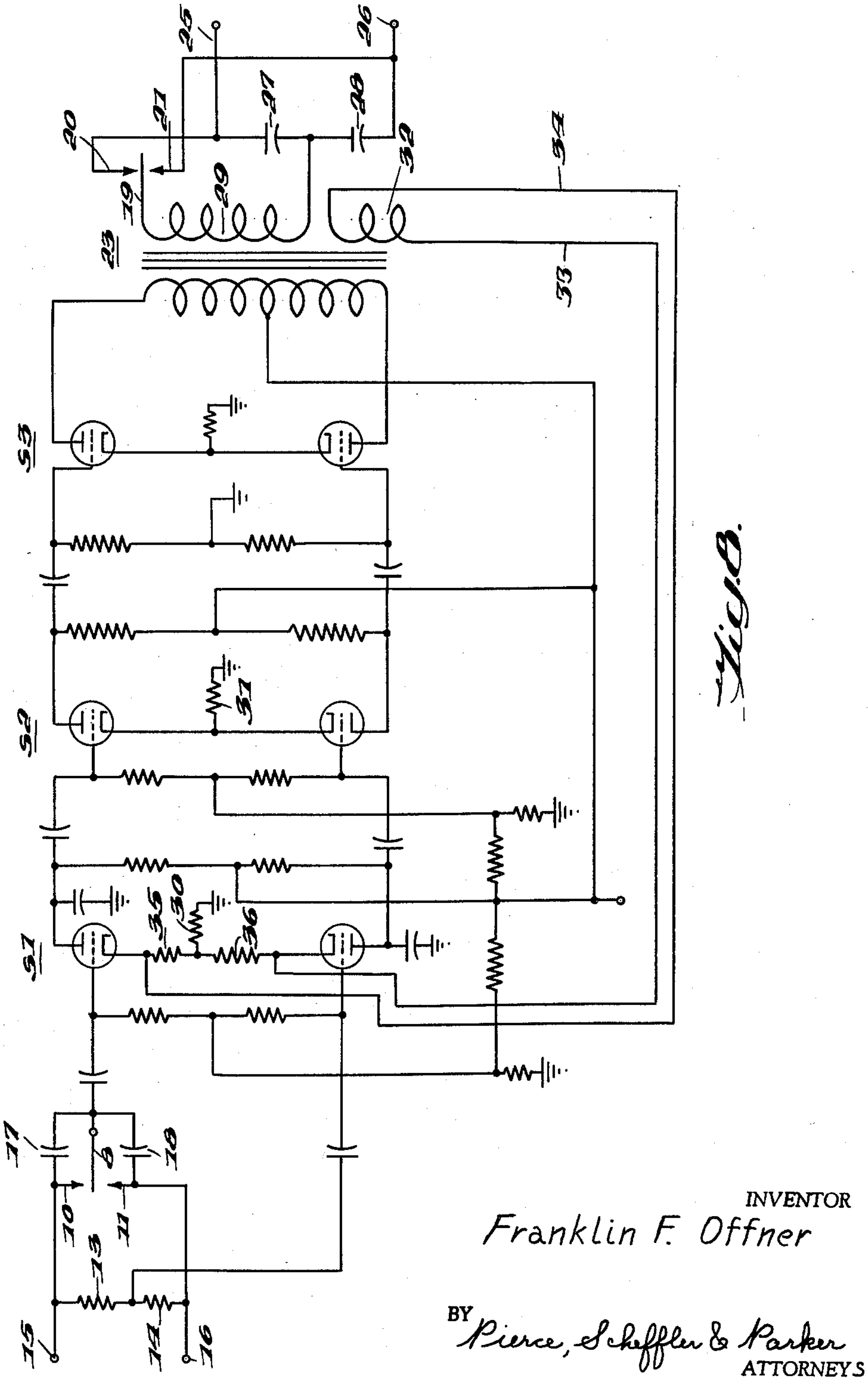
Figure 8 illustrates a complete chopper amplifier, constructed according to the invention.

The amplifier of Figure 1 may be one of a variety of differential amplifiers, employing either vacuum tubes, transistors, or any other amplifying means. A complete vacuum tube amplifier of this type consisting of three stages S1, S2 and S3 is illustrated in Figure 8. This includes an output signal of the type shown in Figure 7. Differential action in this amplifier is assured by the large cathode resistor 30 in the first stage S1, and a similar resistor 31 in the second stage S2. The feedback from the output is inserted in the first stage, through tertiary winding 32 on the output transformer applied via leads 33, 34 across center tapped resistors 35, 36 in the first stage cathodes. Other portions of the amplifier circuit are of conventional form, and need not be redescribed here.

Figure 9:
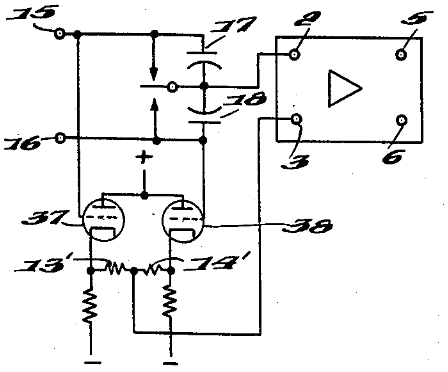
Figures 9 and 10 illustrate alternatives to Figure 5.
Figure 10:
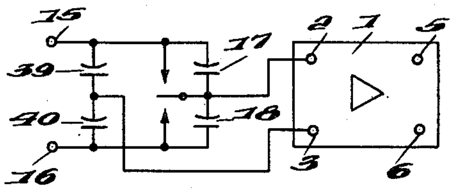

It should be noted that Figures 5 and 8 illustrate only one manner by which the common mode signal may be applied to a differential amplifier for the purpose of cancellation of common mode signal transmission. Other means may be employed. For example, a vacuum tube averaging circuit may be employed, as shown in Figure 9. Here, two cathode-followers 37, 38 precede the averaging resistors 13', 14'. Similarly, condensers could be employed for obtaining the common mode component, as shown in Figure 10. Condensers 39, 40 take the place of resistors 13, 14 of Figure 5 as the averaging circuit for the input.

I claim:

1. An amplifier for A.C. and D.C. signals comprising a periodically acting switch member making alternate contact with two signal input terminals, an averaging circuit connected between said input terminals for deriving the average of the A.C. signal potential applied thereto, a differential amplifier having a pair of ungrounded input terminals, and circuit means connecting said switch member and the output from said averaging circuit respectively to said input terminals of said differential amplifier.

2. An amplifier for A.C. and D.C. signals comprising a first periodically acting switch member making alternate contact with two signal input terminals, an averaging circuit connected between said input terminals for deriving the average of the A.C. signal potential applied thereto, a differential amplifier having a pair of ungrounded input terminals and a pair of output terminal means, circuit means connecting said switch member and the output from said averaging circuit respectively to said input terminals of said differential amplifier, and demodulating means including a second periodically acting switch member operated synchronously with said first switch member and connected to said output terminal means of said differential amplifier.

3. An amplifier for A.C. and D.C. signals as defined in claim 2 including an output circuit comprising two series condensers and wherein said second periodically acting switch member is connected to charge said condensers in alternation.

4. An amplifier for A.C. and D.C. signals as defined in claim 2 which further includes a transformer having its primary connected to said output terminal means, the terminals of the secondary of said transformer being connected in alternation to said second periodically acting switch member, and an output circuit with two terminals, one of said output circuit terminals being connected to said second periodically acting switch member and the other output circuit terminal being connected to an intermediate point on said transformer secondary.

5. An amplifier for A.C. and D.C. signals comprising a periodically acting switch member making alternate contact with two signal input terminals, a circuit for averaging the A.C. signal potential applied to said signal input terminals, said averaging circuit comprising an impedance connected between said signal input terminals, a differential amplifier having a pair of ungrounded input terminals, circuit means connecting said periodically acting switch member to one of said amplifier input terminals and circuit means connecting the other amplifier input terminal to an intermediate point on said impedance.

6. An amplifier for A.C. and D.C. signals comprising a periodically acting switch member making alternate contact with two signal input terminals, a circuit for averaging the A.C. signal potential applied to said signal input terminals, said averaging circuit comprising a resistive impedance connected between said signal input terminals, a differential amplifier having a pair of ungrounded input terminals, circuit means connecting said periodically acting switch member to one of said amplifier input terminals and circuit means connecting the other amplifier input terminal to an intermediate point on said resistive impedance.

7. An amplifier as defined in claim 6 wherein said averaging circuit includes an amplifier connected between said signal input terminals and said resistive impedance is connected to the output from said amplifier.

8. An amplifier for A.C. and D.C. signals comprising a periodically acting switch member making alternate contact with two signal input terminals, a circuit for averaging the A.C. signal potential applied to said signal input terminals, said averaging circuit comprising capacitative reactance means connected between said signal input terminals, a differential amplifier having a pair of ungrounded input terminals, circuit means connecting said periodically acting switch member to one of said amplifier input terminals and circuit means connecting the other amplifier input terminal to an intermediate point on said capacitative reactance means.

References Cited in the file of this patent

UNITED STATES PATENTS

| | | |
|---|---|---|
| 2,459,730 | Williams | Jan. 18, 1949 |
| 2,475,188 | Krauth | July 5, 1949 |
| 2,596,955 | Howe | May 13, 1952 |
| 2,688,729 | Offner | Sept. 7, 1954 |
| 2,714,136 | Greenwood | July 26, 1955 |
| 2,758,079 | Eckfeldt | Aug. 7, 1956 |

OTHER REFERENCES

Text: Vacuum Tube Amplifiers, Valley & Wallman, Radiation Lab. Series, vol. 18, pp. 441–446.